US011563228B2

(12) United States Patent
Bond et al.

(10) Patent No.: US 11,563,228 B2
(45) Date of Patent: Jan. 24, 2023

(54) READILY-DEPLOYABLE MICROBIAL FUEL CELL

(71) Applicant: United States of America as represented by the Secretary of the Navy, San Diego, CA (US)

(72) Inventors: Matthew Lanford Bond, San Diego, CA (US); Yolanda Meriah Arias-Thode, San Diego, CA (US); Lewis Hsu, Oahu, HI (US); David Bart Chadwick, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 258 days.

(21) Appl. No.: 17/157,466

(22) Filed: Jan. 25, 2021

(65) Prior Publication Data

US 2021/0273251 A1    Sep. 2, 2021

Related U.S. Application Data

(60) Provisional application No. 62/984,178, filed on Mar. 2, 2020.

(51) Int. Cl.
*H01M 8/16* (2006.01)
*H01M 4/96* (2006.01)
*H01M 8/04537* (2016.01)

(52) U.S. Cl.
CPC ............... *H01M 8/16* (2013.01); *H01M 4/96* (2013.01); *H01M 8/04611* (2013.01)

(58) Field of Classification Search
CPC combination set(s) only.
See application file for complete search history.

(56) References Cited

U.S. PATENT DOCUMENTS

| 8,012,616 B2 * | 9/2011 | Tender | H01M 4/96 |
| | | | 429/105 |
| 2020/0106116 A1 * | 4/2020 | Bond | H01M 8/2475 |

OTHER PUBLICATIONS

Tang et al.; High-capacity carbon-coated titanium dioxide core-shell nanoparticles modified three dimensional anodes for improved energy output in microbial fuel cells; Journal of Power Sources, vol. 274, pp. 170-176; Jan. 15, 2015.
Ashley E. Franks and Kelly P. Nevin; Microbial Fuel Cells, A Current Review; Energies • May 2010.

* cited by examiner

*Primary Examiner* — Ula C Ruddock
*Assistant Examiner* — Sarika Gupta
(74) *Attorney, Agent, or Firm* — Naval Information Warfare Center, Pacific; Kyle Eppele; J. Eric Anderson

(57) ABSTRACT

A benthic microbial fuel cell comprising: a nonconductive frame having an upper end and a lower end; a plurality of anodes, wherein each anode is a conductive plate having a top section and a bottom edge; a plurality of conductive, threaded rods disposed perpendicularly to the anode plates and configured to secure the top sections of the anodes to the lower end of the frame and to hold the plates in a substantially parallel orientation with respect to each other such that none of the plates are in direct contact with each other; and a plurality of cathodes, wherein each cathode is made of carbon cloth connected to the upper end of the frame.

17 Claims, 5 Drawing Sheets

READILY-DEPLOYABLE MICROBIAL FUEL CELL

CROSS-REFERENCE TO RELATED APPLICATION

This application claims the benefit of prior U.S. Application No. 62/984,178, filed 2 Mar. 2020, titled "Readily-Deployable Microbial Fuel Cell".

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil.

BACKGROUND OF THE INVENTION

This invention relates to microbial fuel cells (MFCs), which are devices capable of harnessing electrochemical voltage gradients produced by microbes that then can be extracted as electrical energy. Benthic MFCs capture energy from anaerobic sediment and donate electrons in the aerobic water column. Existing benthic MFCs can be expensive and difficult to deploy. There is a need for an improved benthic MFC.

SUMMARY

Disclosed herein is a benthic MFC that, in one embodiment, comprises a nonconductive frame, a plurality of anodes, a plurality of rods, and a plurality of cathodes. The frame has an upper end and a lower end. Each anode in the plurality of anodes is a conductive plate having a top section and a bottom edge. The rods are conductive and threaded, and they are disposed perpendicularly to the anode plates. The rods are also configured to secure the top sections of the anodes to the lower end of the frame and to hold the plates in a substantially parallel orientation with respect to each other so that none of the plates are in direct contact with each other. Each of the cathodes of the plurality of cathodes is made of carbon cloth connected to the upper end of the frame.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed benthic MFC below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

Figure 1:
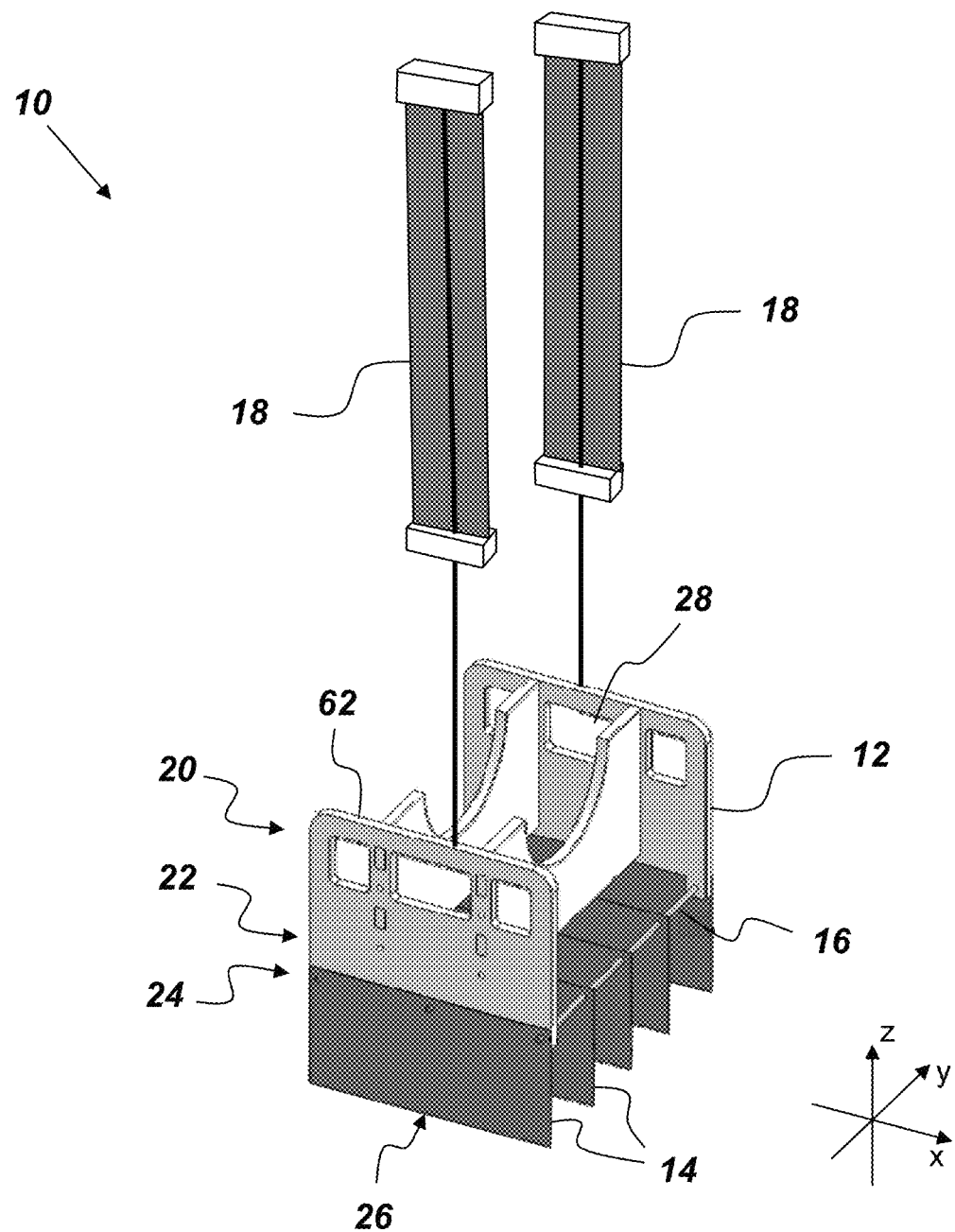
FIG. 1 is a perspective view of an embodiment of a benthic MFC.

FIG. 1 is a perspective view of an embodiment of a benthic MFC 10 that comprises, consists of, or consists essentially of a frame 12, a plurality of anode plates 14, a plurality of rods 16, and a plurality of cathodes 18. The benthic MFC 10 is designed to be pushed into sediment at the bottom of a body of water (i.e., benthic or riverine environments) such that the anode plates 14 are completely covered by the sediment. The benthic MFC 10 may be used to harvest energy from the sediment. The frame 12 is nonconductive and has an upper end 20 and a lower end 22. The frame 12 may be configured to hold a pressure housing (such as the pressure housing 58 shown in FIG. 5) or other electronics housing. Each anode plate 14 is conductive and has a top section 24 and a bottom edge 26. The rods 16 are conductive to electricity and threaded. The rods 16 are disposed perpendicularly to the anode plates 14 and configured to secure the top sections 24 of the anodes 14 to the lower end 22 of the frame 12. The rods 16 also hold the anode plates 14 in a substantially parallel orientation with respect to each other such that none of the anode plates 14 are in direct contact with each other. As used herein, the term "substantially parallel" means that there is no more than 15 degrees difference between the orientation of the plates in any dimension of a three-dimensional orthogonal coordinate system, such as is shown in FIG. 1. The rods 16 simultaneously provide structural and electrical connection between the anode plates 14. Each of the cathodes 18 is made of carbon cloth and is connected to the upper end 20 of the frame 12.

The frame 12 may be any structure that is nonconductive. Suitable materials from which to make the frame 12 include, but are not limited to polyvinyl chloride (PVC) and plastic. In the embodiment of the benthic MFC 10 shown in FIG. 1, the frame 12 includes handholds 28 to enable one to carry/maneuver the benthic MFC 10.

Figure 2A:
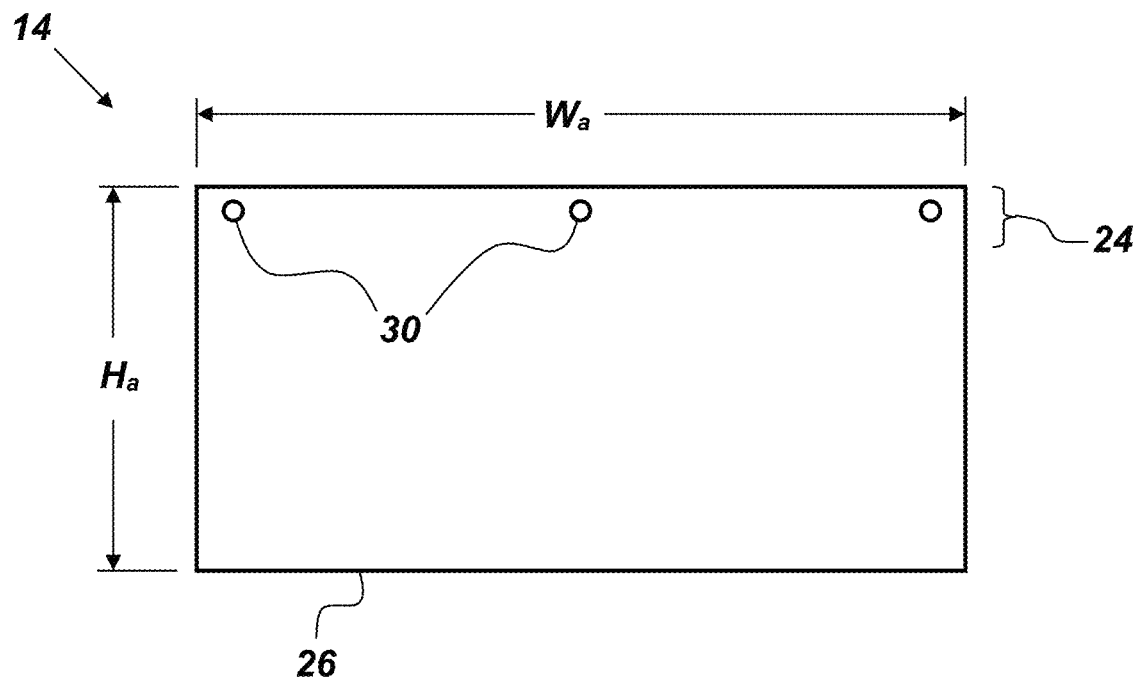
FIG. 2A is a side-view illustration of an example embodiment of an anode plate.
Figure 2B:
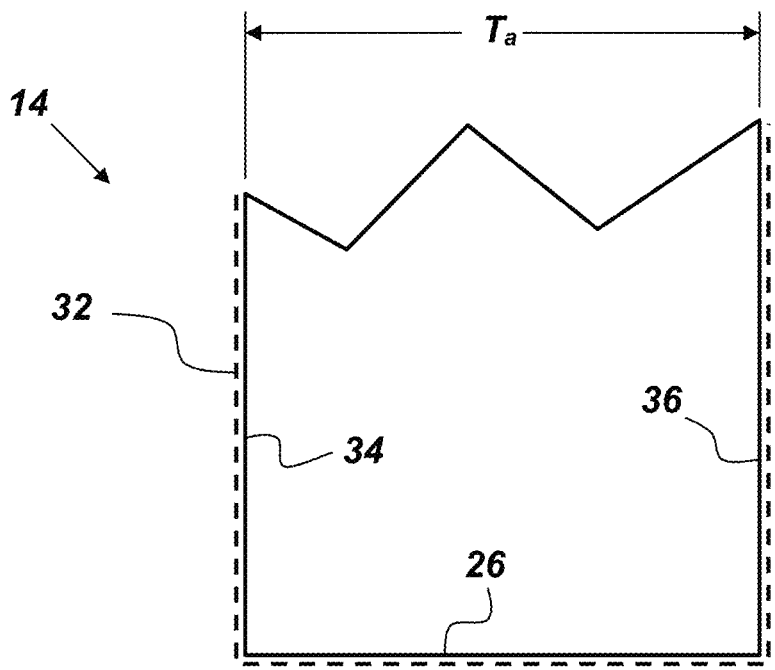
FIG. 2B is a front-view illustration of an example embodiment of an anode plate.

FIGS. 2A and 2B are respectively side- and front-view illustrations of an example embodiment of an anode plate 14. The anode plates 14 may be any desired size or shape and may be made of any conductive material. It is desirable for the anode plates 14 to be constructed of a material that is also resistant to corrosion. Suitable material from which the anode plates 14 may be made include, but are not limited to, titanium and three-dimensionally (3D)-printed, conductive material. Electrical and mechanical connections may be made by titanium bolts/nuts or by the melting/connection of anode plates 14. With conductive material that is 3D-printed, carbon cloth is not necessary. FIG. 2A shows an example rectangular embodiment of an anode plate 14 that has a height $H_a$ of 15.24 centimeters (cm) (6 inches) and a width $W_a$ of 30.48 cm (12 inches). In the embodiment of the anode plate 14 shown in FIGS. 2A and 2B, the anode plate 14 is a titanium plate having a thickness $T_a$ of 0.89 millimeters (35 thousandths of an inch). Holes 30 are drilled into the top section 24 to allow the threaded rod 16 (shown in FIG. 1) to pass there through. It is to be understood that the benthic MFC 10 is not limited to having anode plates 14 with the dimensions above; the aforementioned dimensions are merely offered as examples.

Cloth-covered titanium anodes are very thin, very strong, non-corrosive, very conductive, and provide a good substrate for bacteria. It is desirable for the anode plates 14 to have a thickness no greater than 1 millimeter to facilitate pushing them into the benthic sediment. At the same time, it is desirable that the anode plates 14 be strong due to the significant force required to push them into the sediment. In addition, rocks and other debris can be encountered while pushing the anode plates 14 into the sediment. Previous designs that used carbon sheets were brittle and often broke during installation. The titanium and carbon cloth are both non-corrosive even under highly reducing sediment conditions and the combination is very conductive. The unique combination of titanium covered with carbon cloth is strong, conductive, and non-corrosive. The carbon cloth has been demonstrated in comparison to other materials to be optimal for energy production from sediment microbes. Thus finding a way to insert the cloth into the sediment with a rigid structure that is highly conductive provides a desired way for harvesting energy from benthic microbial action.

FIG. 2B is a partial, magnified front-view illustration of an embodiment of the anode plate 14. As shown in FIG. 2B, the anode plate 14 may be covered by carbon cloth 32 represented by the dashed line. Suitable examples of the carbon cloth 32 include, but are not limited to, woven carbon fiber fabric, graphite fiber, carbonized cloth, and carbonized polymerization of acrylonitrile (PAN)-based materials. A specific example of a suitable material for the carbon cloth 32 is the product PANEX® 30 (a woven, PAN-based, carbon fiber fabric) manufactured by Zoltek, Inc. of St. Louis, Mo. Ideally, the carbon cloth 32 may be adhered to a polished first side 34 of the anode plate 14, wrapped around the bottom edge 26, and adhered to an opposite, polished side 36 of the anode plate 14. This is done, in part, to minimize the intrusion of sediment or other material between the carbon cloth 32 and the anode plate 14 during deployment when the anode plate 14 is pushed into benthic sediment.

The rods 16 hold the anode plates 14 apart from each other. Ideally, the rods 16 are threaded and the anode plates 14 are held in place with nuts and washers. Spacers may also be mounted to the rod 16 and used to keep the anode plates 14 separated by a desired distance. In other words, the anode plates 14 may be held spaced apart by spacers that surround the threaded rod 16 and are sandwiched between adjacent anode plates 14. Having the anode plates 14 connected to the frame 12 and held in position by nothing more than the rods 16 enables the benthic MFC 10 to be easily repaired and adjusted in the field with minimal skill and tools required. The ability to rapidly adjust the configuration of the benthic MFC 10 enables the benthic MFC 10 to be deployed to any given site without extensive, prior site surveys. The anode plates 14 can even be adjusted on-site to avoid roots, rocks, and/or other obstacles that might prevent the anode plates 14 from being fully covered by the sediment. In one embodiment, the rods 16 are threaded titanium rods. The threaded rods 16 provide physical support for the anode plates 14 and also function as electrical connectors between the anode plates 14.

Figure 3:
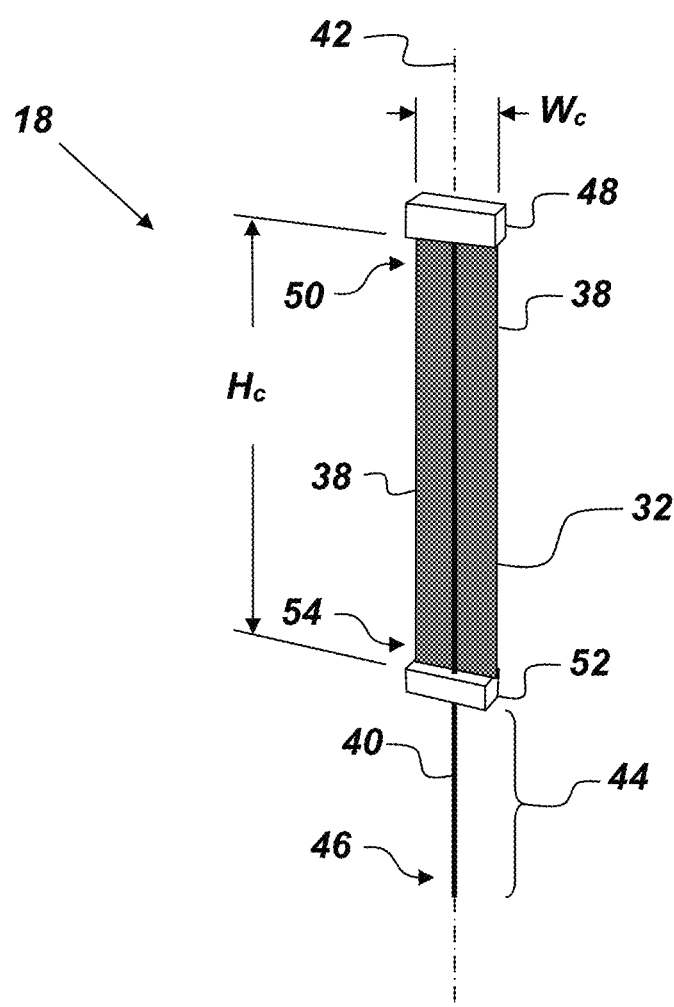
FIG. 3 is a perspective view of an embodiment of a cathode.

FIG. 3 is a perspective view of an embodiment of a cathode 18. In this embodiment, the cathode 18 is made of flat carbon cloth 32, which has had its edges 38 trimmed and hemmed with a serger using black polyester thread, resulting in a cathode height $H_c$ of 1 meter and a cathode width $W_c$ of 12 cm. The cathode 18 is connected to the frame 12 by a wire 40, which in this embodiment is a 1.5 meter, 22-gauge, 7-strand, braided titanium wire, threaded through a centerline 42 of the cathode 18 and secured with a zigzag stitch, ensuring 50 cm wire overhang 44 between the bottom end 54 of the cathode 18 and the frame 12. Again, it is to be understood that the dimensions presented in the preceding sentence are examples only and the benthic MFC 10 is not limited to such dimensions. A first end 46 of the wire 40 may be used to connect the cathode 18 to the upper end 20 of the frame 12 (as shown in FIG. 1). FIG. 3 shows a float 48 connected to a top end 50 of the cathode 18. FIG. 3 also shows an optional secondary float 52 connected to a bottom end 54 of the cathode 18. The float 48 and the secondary float 52 may be any desired size and shape and may be made of any material with sufficient buoyancy to keep the cathode 18 afloat above the frame 12. A suitable example of material from which the float 48 and the secondary float 52 may be made includes, but is not limited to, solid cell foam (e.g., ethylene-vinyl acetate foam). The float 48 and the secondary float 52 may be attached to the cathode 18 via adhesive, thread, fasteners, and the like.

Figure 4:
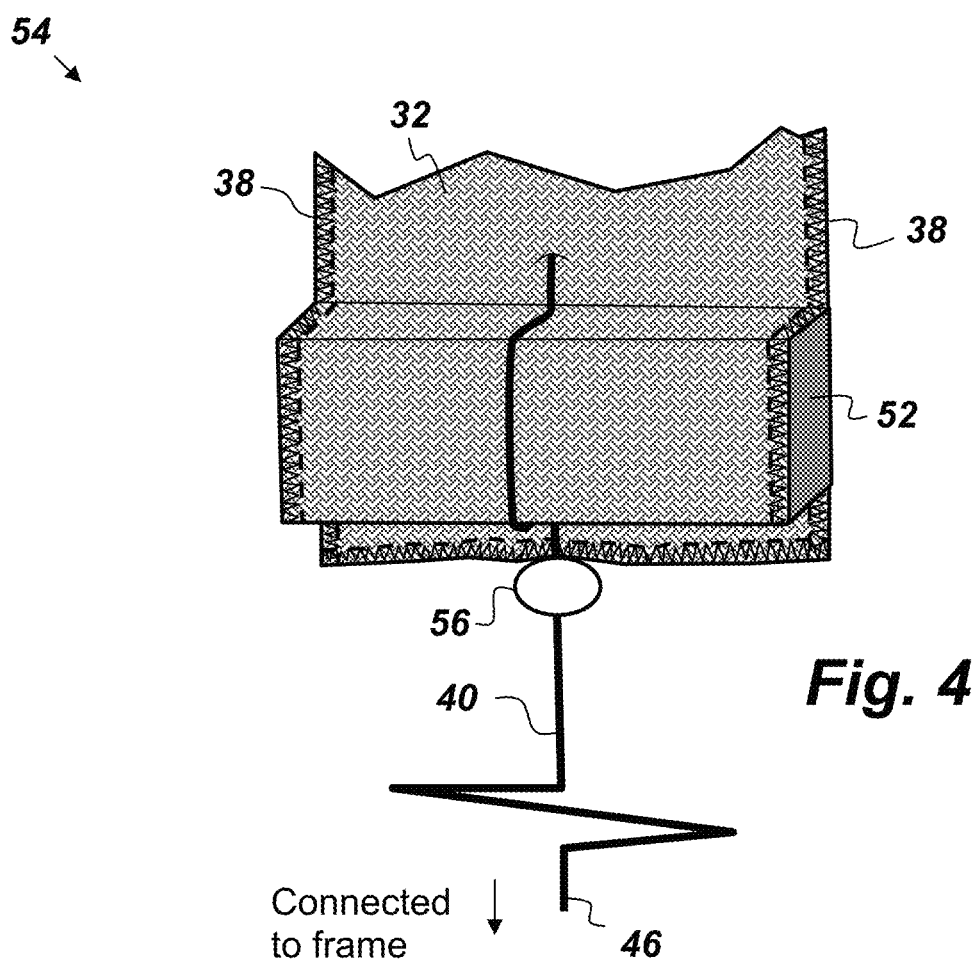
FIG. 4 is a perspective view of a bottom end of a cathode with carbon cloth sewn around a float.

FIG. 4 is a perspective view of the bottom end 54 of an embodiment of the cathode 18. In this embodiment, the carbon cloth 32 is sewn around the secondary float 52. The wire 40 is also sewn into the carbon cloth 32 except where the wire 40 is routed around the secondary float 52. Sections of the wire 40 that are routed around floats, the wire overhang 44, and any other exposed areas of the wire 40 may be covered with heat shrink to protect against the elements. Also shown in FIG. 4 is an optional marker 56. The marker 56 is attached to the wire 40 at the bottom end 54 of the cathode 18 and helps divers/deployment personnel to identify visually and tactilely the location of the bottom of the secondary float 52. In one embodiment, the cathodes 18 may each be rolled into rolls and held by rubber bands prior to deployment. Upon deployment, the divers/deployment personnel remove the rubber bands and unfurl the cathode 18. The marker 56 helps the divers/deployment personnel visibly and tactilely identify the bottom end 54 of the cathode 18 so they do not pull on the cathodes 18. In one example embodiment, the marker 56 may be a fishing float.

Figure 5:
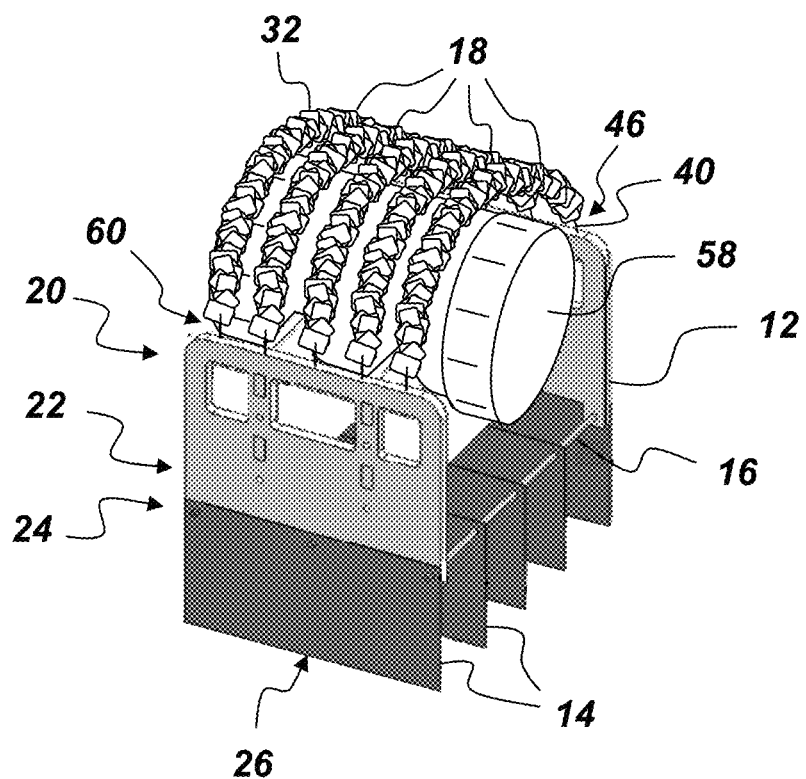
FIG. 5 is a perspective view of an embodiment of a readily-deployable MFC.

FIG. 5 is a perspective view of a scrunchy cathode embodiment of the benthic MFC 10. In this embodiment, the carbon cloth 32 of each of the cathodes 18 is gathered or scrunched over the wire 40 to increase the surface area of carbon cloth 32 over the length of the wire 40. Also shown in FIG. 5 is a pressure housing 58 mounted to the frame 12. Electrical connections from the cathodes and the anodes lead into the pressure housing 58. The first end 46 of the wire 40 may be attached to the upper end 20 of the frame 12. The wire 40 has a second end 60, which may be attached to the float 48, or, as is shown in FIG. 5, the second end 60 may be attached to the upper end 20 of the frame 12. Some embodiments of the frame 12 may include a conductive rail 62 (shown in FIG. 1) attached to the upper end 20 of the frame 12. All the first ends 46 of the wires 40 may be attached both physically and electrically to the conductive rail 62. A suitable example of the conductive rail 62 is a titanium shim adhered to the upper end 20 of the frame 12. The wire 40 may be a flexible wire or rigid/stiff wire, such as portrayed in FIG. 5, that is able to maintain its shape. Electrically-conductive wires, such as flexible titanium wire, may connect the conductive rail 62 to electronics within the pressure housing 58. Electrically-conductive wires, such as flexible titanium wire, may also be used to connect the rods 16 to electronics within the pressure house 58. The embodiment of the benthic MFC 10 shown in FIG. 5 may be useful for use in shallow environments.

The benthic MFC 10 is portable and deployable with minimal manpower, little to no tools, and is able to harvest energy from the sediment in a body of water. The benthic MFC 10 can be assembled and disassembled with simple hand tools, with parts that are modular and easily replaceable/serviceable in the field. The benthic MFC 10 may be used in ocean water, brackish water, fresh water, or wastewater. Harvested energy is on the order of milliwatts to watts based on build scale. Several benthic MFC 10 units can be coupled together to increase the amount of harvested energy. The benthic MFC 10 is recoverable and reusable by as little as a single individual regardless of level of training, with little to no servicing required. This benthic MFC 10 can integrate a variety of electronics that can be used to harvest energy to determine power potential, or, harvest power to power sensors underwater. In one embodiment of the benthic MFC 10, a potentiostat board is housed in the pressure housing 58 and designed to measure electrical potential while burning off current generated using a resistor.

In one embodiment of the benthic MFC 10, each anode plate 14 has a width $W_a$ of 1 meter and a height $H_a$ of 22.86 centimeters. Multiple benthic MFC 10 units can be positioned near each other and in series in order to power different sensors, communication devices, or other similar electronics. The electronics may be designed to trickle charge a battery that in turn, powers a sensor. The frame 12 may be built and bolted to the anode plates 14, serving as a lift point for the benthic MFC 10, as well as a platform to attach the pressure housing 58 and the array of cathodes 18. The number of connection points between the frame 12 and the anode plates 14 can be as few as two and is variable depending on the selected anode size. The larger the scale of the MFC, the more connection points will be needed to satisfy desired mechanical strength for transport and installation/extraction.

The size of the cathodes 18 may be chosen to provide sufficient oxygen at the cathode for long-term MFC generation, as the MFC is dependent on the oxygen reduction reaction at the cathode 18. The total surface areas of the cathodes 18 may be greater than or equal to 1.5 times the total surface area of the anode plates 14. In one embodiment of the benthic MFC 10, titanium wires were routed from the anode plates 14 and the cathodes 18 to the pressure housing 12 by use of wet-mateable pigtails (such as the Teledyne Impulse wet-mateable pigtail manufactured by Teledyne Marine) and bulkhead connectors. Titanium wires from the cathodes 18 and the anode plates 14 in one embodiment were passed into a PVC cylinder that housed a flyback based DC/DC converter. The output of the DC/DC converter was directly connected to a wet-mateable pigtail that passed through the PVC Cylinder. The PVC cylinder was then made watertight by use of epoxy. Connectors may be used to connect several benthic MFC 10 units. The DC/DC converter may be used to step up the harvested voltage to a higher voltage (e.g., from 0.4 volts to 12 volts) The DC/DC converter may also be used to regulate the output voltage from the benthic MFC 10 unit. The modular/man-portable size of some embodiments of the benthic MFC 10 allows for an expanded number of sites to be deemed feasible for deployment, increasing usability of MFCs in general. The compact form, along with the ease of deployment allows for the use of multiple modular benthic MFC 10s in a single system, not limited by a discontinuous available seafloor. The MFC 10 may also be used to determine potential power production in various locations of the world.

A choice between semi-rigid, scrunchy cathodes 14 (such as depicted in FIG. 5) and flexible, buoyant cathodes 14 (such as depicted in FIG. 1) results in the ability to tailor the benthic MFC 10 to the environment and potential constraints on the system due to water levels, nearby obstacles, or deployment requirements. Anode plates could be made of conductive 3D printed material.

From the above description of the benthic MFC 10, it is manifest that various techniques may be used for implementing the concepts of the benthic MFC 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the benthic MFC 10 is not limited to the particular embodiments described herein, but is capable of many embodiments without departing from the scope of the claims.

We claim:

1. A benthic microbial fuel cell comprising:
   a nonconductive frame having an upper end and a lower end;
   a plurality of anodes, wherein each anode is a conductive plate having a top section and a bottom edge;
   a plurality of conductive, threaded rods disposed perpendicularly to the anode plates and configured to secure the top sections of the anodes to the lower end of the frame and to hold the plates in a substantially parallel orientation with respect to each other such that none of the plates are in direct contact with each other; and
   a plurality of cathodes, wherein each cathode is made of carbon cloth connected to the upper end of the frame.

2. The benthic microbial fuel cell of claim 1, wherein each conductive plate is covered by carbon cloth.

3. The benthic microbial fuel cell of claim 2, wherein for each anode, the carbon cloth is adhered to one side of the conductive plate, folded over the bottom edge, and adhered to an opposite side of the conductive plate.

4. The benthic microbial fuel cell of claim 3, wherein each cathode comprises a conductive wire sewn to the carbon cloth over a length of the carbon cloth, and wherein a first end of the wire is used to connect the cathode to the upper end of the frame.

5. The benthic microbial fuel cell of claim 4, wherein the carbon cloth is scrunched on the wire.

6. The benthic microbial fuel cell of claim 4, wherein a float is connected to a top end of each cathode.

7. The benthic microbial fuel cell of claim 6, wherein a secondary float is connected to a bottom end of each cathode.

8. The benthic microbial fuel cell of claim 5, wherein a second end of each cathode's wire is connected to the upper end of the frame.

9. The benthic microbial fuel cell of claim 3, wherein the plates are held spaced apart by spacers that surround the threaded rod and are sandwiched between adjacent plates.

10. The benthic microbial fuel cell of claim 3, wherein the plates are held spaced apart by a plurality of nuts and washers threaded onto the threaded rod.

11. The benthic microbial fuel cell of claim 3, wherein the plates, the rods, and the wires are made of titanium.

12. The benthic microbial fuel cell of claim 11, wherein no welded joints are present on the microbial fuel cell.

13. The benthic microbial fuel cell of claim 3, further comprising a pressure housing mounted to the frame, wherein electrical connections from the cathodes and the anodes lead into the pressure housing.

14. The benthic microbial fuel cell of claim 4, further comprising a conductive rail connected to the upper end, wherein the wires of all the cathodes are electrically connected to the conductive rail.

15. The benthic microbial fuel cell of claim 1, wherein the plates are made of three-dimensionally-printed conductive material.

16. The benthic microbial fuel cell of claim 13, wherein the pressure housing contains electronics for measuring power generation potential of a given location and wherein current generated by the benthic microbial fuel cell is dissipated by a resistor.

17. The benthic microbial fuel cell of claim 3, wherein the conductive plates are less than a millimeter thick.

* * * * *